(12) United States Patent
Caruel

(10) Patent No.: US 9,969,499 B2
(45) Date of Patent: May 15, 2018

(54) NACELLE FOR AN AIRCRAFT TURBOJET ENGINE WITH AN EXTENDED FRONT LIP

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 252 days.

(21) Appl. No.: 14/885,422

(22) Filed: Oct. 16, 2015

(65) Prior Publication Data
US 2016/0039528 A1  Feb. 11, 2016

Related U.S. Application Data

(63) Continuation of application No. PCT/FR2014/050930, filed on Apr. 16, 2014.

(30) Foreign Application Priority Data

Apr. 19, 2013 (FR) ..................... 13 53584

(51) Int. Cl.
*B64D 29/06* (2006.01)
*B64D 33/02* (2006.01)
(Continued)

(52) U.S. Cl.
CPC ............ *B64D 29/06* (2013.01); *B64D 33/02* (2013.01); *F01D 25/24* (2013.01); *F02C 7/04* (2013.01);
(Continued)

(58) Field of Classification Search
CPC  B64D 29/06; B64D 29/00; F02K 3/06; F02C 3/04
(Continued)

(56) References Cited

U.S. PATENT DOCUMENTS 8,197,191 B2  6/2012 Binks et al.
8,267,642 B2  9/2012 Binks et al.
(Continued)

FOREIGN PATENT DOCUMENTS

EP  1715160 A1  10/2006
FR  2757823 A1  7/1998
(Continued)

OTHER PUBLICATIONS

International Search Report dated Jul. 25, 2014 in International Application No. PCT/FR2014/050930.

*Primary Examiner* — Justin Seabe
*Assistant Examiner* — Behnoush Haghighian
(74) *Attorney, Agent, or Firm* — Burris Law, PLLC

(57) ABSTRACT

A nacelle for an aircraft turbojet engine includes: a substantially cylindrical internal envelope, a substantially cylindrical external envelope, a downstream partition wall and an upstream partition wall secured to the cylindrical internal envelope and a front lip disposed forward of the upstream partition wall. The cylindrical internal envelope includes an upstream portion including an acoustic shroud connected, by an attachment flange, to a downstream portion including a fan casing. In particular, the front lip is extended and disposed over the upstream partition wall by presenting a downstream edge between the upstream and downstream partition walls in order to be secured to a homologous edge of the cylindrical external envelope so as to arrange a maintenance access to the attachment flange.

12 Claims, 3 Drawing Sheets

Figure 4:
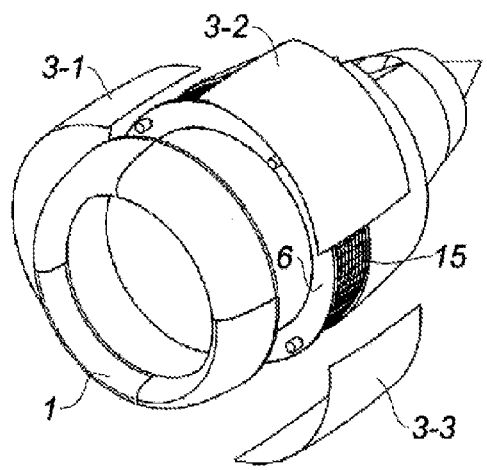

(51) Int. Cl.
    *F02C 7/04*         (2006.01)
    *F02K 1/64*         (2006.01)
    *F01D 25/24*       (2006.01)
    *F02C 3/04*         (2006.01)
    *F02K 3/06*         (2006.01)

(52) U.S. Cl.
    CPC ........ *F02K 1/64* (2013.01); *B64D 2033/0206* (2013.01); *B64D 2033/0273* (2013.01); *F02C 3/04* (2013.01); *F02K 3/06* (2013.01); *F05D 2220/323* (2013.01); *F05D 2220/327* (2013.01); *F05D 2260/96* (2013.01); *Y02T 50/672* (2013.01)

(58) Field of Classification Search
    USPC ........................................................ 415/220
    See application file for complete search history.

(56) References Cited

U.S. PATENT DOCUMENTS

| | | | | |
|---|---|---|---|---|
| 2006/0145001 A1* | 7/2006 | Smith | .................... | B64D 29/06 244/110 B |
| 2010/0287910 A1* | 11/2010 | Joret | .................... | B64D 29/02 60/226.2 |

FOREIGN PATENT DOCUMENTS

| | | | |
|---|---|---|---|
| FR | 2906568 A1 | 4/2008 | |
| FR | 2914363 A1 | 10/2008 | |
| FR | 2936777 A1 | 4/2010 | |

\* cited by examiner

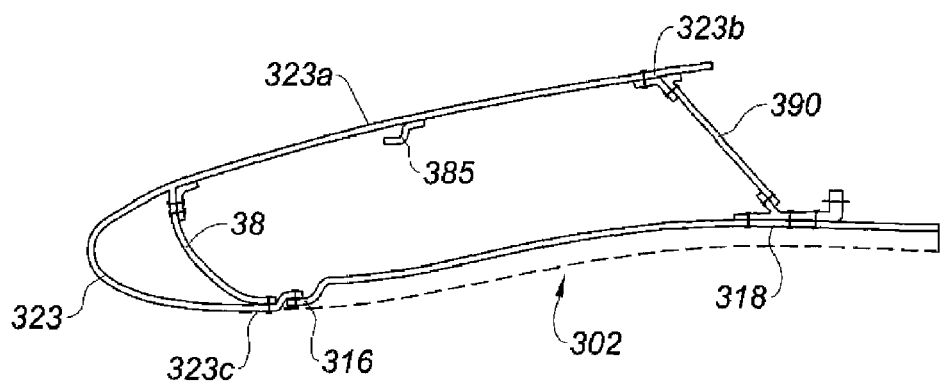
Fig. 1 "Prior Art"
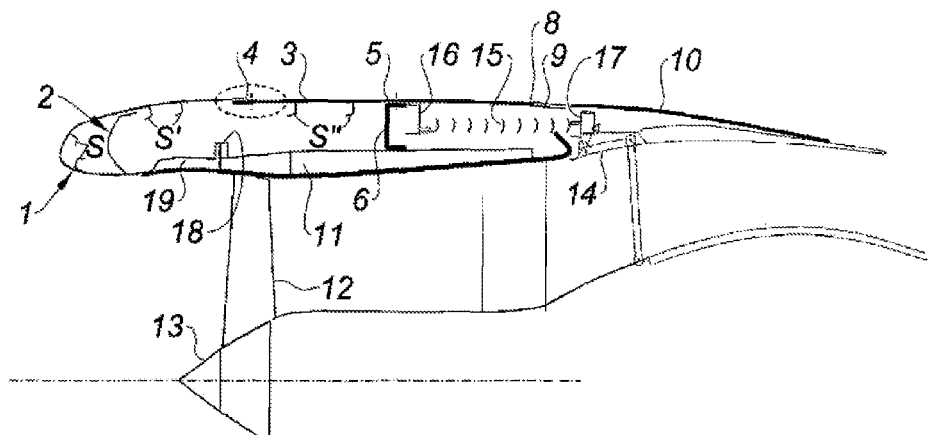
Fig. 2
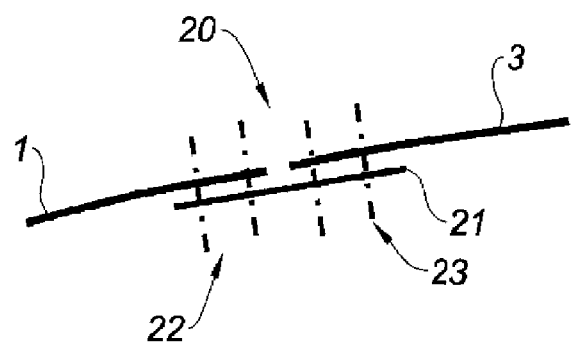
Fig. 3

NACELLE FOR AN AIRCRAFT TURBOJET ENGINE WITH AN EXTENDED FRONT LIP

CROSS-REFERENCE TO RELATED APPLICATIONS

This application is a continuation of International Application No. PCT/FR2014/050930, filed on Apr. 16, 2014, which claims the benefit of FR 13/53584, filed on Apr. 19, 2013. The disclosures of the above applications are incorporated herein by reference.

FIELD

The present disclosure relates to a nacelle for an aircraft turbojet engine with an extended front lip presenting a new and advantageous structure.

BACKGROUND

The statements in this section merely provide background information related to the present disclosure and may not constitute prior art.

An aircraft is moved by one or several turbojet engine(s) each housed in at least one nacelle. The nacelle presents generally a tubular structure comprising an air inlet section upstream of the turbojet engine, a mid-section intended to surround a fan of the turbojet engine, a downstream section accommodating the thrust reversal means. The downstream section of the nacelle surrounds the gas generator of the turbojet engine which is terminated by an ejection nozzle located downstream of the turbojet engine. The air inlet section of the nacelle includes in particular a generally annular-shaped front lip which intercepts the inlet air flow of the nacelle which is directed toward a fan. A nacelle generally presents a structure comprising an upstream air inlet section, upstream of the engine, a mid-section intended to surround a fan of the turbojet engine, and a downstream section intended to surround the combustion chamber of the turbojet engine and accommodating a thrust reverser device.

Lengthening the front lip of the nacelle is in particular desired for aerodynamic reasons, in order to extend downstream the laminar air flowing area. Nonetheless, its lengthening is not without repercussions on the design of the rest of the nacelle. Particularly, the nacelle should present good mechanical rigidity performances in order to reduce its deformations when subjected to stresses during operation.

In the state of the art, there is a model of nacelle, illustrated for example in U.S. Pat. No. 8,197,191 in which the front lip is constituted by a single annular-shaped part and which is directly fastened on support partition walls inside the nacelle. Note also the use of an upstream partition wall which forms an annular volume behind the <<D>>-shaped front lip. The upstream (or front) partition wall is generally secured to the internal envelope of the inlet section of the nacelle by its front edge.

In this document, the nacelle inlet section of an aircraft turbojet engine presents a turbojet engine envelope including a front flank. The nacelle inlet section includes:

an inner acoustic part, substantially cylindrical and presenting an upstream edge and a downstream edge;
an external envelope comprising a lip presenting an internal edge and a substantially cylindrical outer portion presenting a downstream portion;
a downstream mounting flange configured for mounting the inlet section to a front flange of an envelope of the turbojet engine; and
a rear partition wall presenting a downstream end for securing the outer portion of the external envelope to the downstream mounting flange.

As a result, the part which forms the front lip which limits the fresh air inlet of the nacelle presents in cross section a complex and large sized shape. In U.S. Pat. No. 8,267,642, there is defined an outer envelope of a nacelle inlet section which includes a substantially cylindrical internal portion and a rear partition wall. The outer envelope includes:

a front lip with fasteners on the internal portion; and
an outer envelope extending downstream from the lip and intended to be attached to the rear partition wall.

In the document, the front lip and the outer envelope form one single piece.

Such an arrangement described in the state of the art aims mainly at two objectives. Such a structure allows resisting an event such as blade breakage of the turbojet engine fan mounted inside the nacelle. In addition, it allows for savings in material mass and in complexity of parts in comparison with the older state of the art wherein the outer envelope and the front lip of the inlet section of the nacelle are constituted by separate parts.

However, in spite of their advantages, these arrangements require the adjunction of annular reinforcements, disposed inside the outer envelope. Furthermore, the thus formed single part has a large dimension and a significant volume. Its realization requires a complex and expensive tool.

Nonetheless, the solution of a lip that is integral with the outer envelope of the inlet section of the nacelle also encounters problems of adaptation with other requirements.

Among these, mention may be made in particular to the problem of maintenance. Indeed, in order to inspect the different systems such as the de-icing system or inspect the condition of the structure, we must to be able to access to the space comprised between the front and rear (or downstream) partition walls which is then inaccessible if the part that forms the lip and the outer envelope is in one single piece.

In order to provide access to the volume created below the external envelope of the air inlet section of the nacelle, a passage for an access hatch is provided, which considerably reduces the rigidity of the assembly and does not allow for one single piece combining the front lip and the outer envelope.

Finally, there is a particular structure of the internal envelope of the nacelle. This internal envelope includes an upstream portion (on the air inlet section side of the nacelle) constituted by an acoustic shroud and a downstream portion (on the thrust reverser side) comprising a fan casing. Both upstream and downstream portions are connected by an attachment flange. Nonetheless, a maintenance operation is made difficult through an advanced front lip integral with the downstream partition wall. Indeed, the skin constituted by this front lip integral with the downstream partition wall should be interrupted in order to arrange an access hatch, thereby weakening it, on the one hand, and breaking the aerodynamic continuity of the skin, on the other hand.

SUMMARY

The present disclosure provides a nacelle for an aircraft turbojet engine of the kind including a substantially cylindrical internal envelope, a substantially cylindrical external envelope, a downstream partition wall and an upstream partition wall secured to said internal envelope, and a front lip disposed forward of said upstream partition wall, the internal envelope being of the kind including an upstream portion including an acoustic shroud connected, by an attachment flange, to a downstream portion including a fan casing.

According to the present disclosure, the front lip is extended and disposed over the upstream partition wall by presenting a downstream edge between the upstream and downstream partition walls so that to be secured to a homologous edge of the external envelope so as to preserve the maintenance access to said attachment flange.

According to other features of the present disclosure:
the downstream partition wall is secured to the fan casing 11;
the nacelle is of the kind including a thrust reverser, and the downstream partition wall is disposed at the limit of the rest area of the thrust reverser, and the external envelope extends beyond the thrust reverser on said downstream partition wall;
the external envelope is also fastened to the edge of the downstream partition wall;
the fastening of the homologous edges of the extended front lip and the external envelope includes at least one annular plate which carries means of fastening to the downstream edge of the extended front lip and to the homologous edge of the external envelope;
an annular plate is integral with the internal face of the downstream edge of the extended front lip;
the extended front lip and/or the external envelope are made of at least two angular sectors;
at least one angular sector of the external envelope is provided with removable means of fastening to the extended front lip, removable means of fastening to the downstream partition wall and removable means of fastening to the adjacent angular sectors of the external envelope;
the extended front lip and/or the external envelope is made of metal, in particular aluminum, and/or of composite material;
the internal face of the external envelope and/or of the extended front lip includes annular reinforcements;
the nacelle includes at least one additional partition wall, secured to the fan casing of the turbojet engine and disposed between the upstream partition wall and the downstream partition wall, and extending on at least one portion of the circumference of the air inlet.

Further areas of applicability will become apparent from the description provided herein. It should be understood that the description and specific examples are intended for purposes of illustration only and are not intended to limit the scope of the present disclosure.

DRAWINGS

Figure 5:
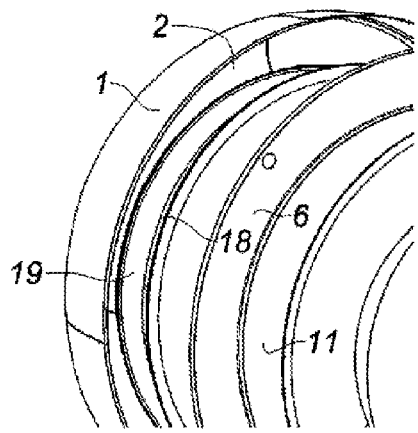

In order that the disclosure may be well understood, there will now be described various forms thereof, given by way of example, reference being made to the accompanying drawings, in which:

FIG. 1 represents a nacelle of the state of the art;
FIG. 2 represents an form of the present disclosure;
FIG. 3 represents a detail of the form of FIG. 1;
FIGS. 4 and 5 represent two exploded views of the mounting of a turbojet engine in a nacelle of the present disclosure;
FIGS. 6 to 9 represent details of the form of FIG. 2; and
FIG. 10 represents another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, there is represented the inlet section of a nacelle of the state of the art. In the following description, the nacelle is oriented with its inlet section to the left of the drawing with the fresh air inlet determining an upstream position, and toward the right, toward the hot gases outlet which determines a downstream position. The inlet section of the nacelle includes:
a substantially cylindrical inner acoustic part 302 having an upstream edge and a downstream edge;
an outer envelope comprising a lip 323 presenting an internal edge 323c and a substantially cylindrical outer portion 323a presenting a downstream or rear portion 323b;
a front or upstream partition wall 38 which extends backward of the lip 323 itself and which extends radially between the internal edge 323c of the front lip and its external portion 323a; and
a downstream or rear partition wall 390 extending substantially radially and presenting a downstream end for securing the outer portion 323a of the external envelope to a downstream mounting flange.

In FIG. 2, there is represented an form of the present disclosure wherein the rear partition wall 6 has been moved back until coming into contact with the front portion of a thrust reverser 15-17 in its rest position and/or area. Here, the thrust reverser consists of a cascade-type thrust reverser 16. Nonetheless, other types, such as a door-type thrust reverser, are provided. Note that the rest position is assumed when the thrust reverser is in a condition where it does not intervene on the flowing that comes from the fan (not represented). In this condition, the thrust reverser is retracted under the external envelope 3 which serves as a fan cowl. In contrast, in its active condition, the thrust reverser leaves its rest area going downstream, and as will be explained later, the flowing that comes from the fan is reversed and returns to the outside of the external envelope or fan cowl 3 going upstream of the nacelle.

The front lip forms a section with the front (or upstream) partition wall allowing to close an annular channel in which can circulate in particular a de-icing fluid of the nacelle. Then, the outer envelope is secured to the upper edge of the front lip and continues its extension up to the rear partition wall and beyond so as to reach the upstream area of the nacelle.

The extended front lip and described in FIG. 1, allows avoiding that the surface imperfection at the junction between the lip and the external envelope and the rivets located in the front (upstream) area of the external envelope of the inlet section of the nacelle do disturb the flowing of air around the nacelle.

However, lengthening the front lip up to the rear partition wall, if it provides a fastening of the upper edge of the extended front lip up to the rear partition wall, makes the reserved volume between the front (upstream) partition wall and rear (downstream) partition wall inaccessible for maintenance.

In one form of the present disclosure described in FIG. 2, the downstream partition wall 6 is moved back up to its possible extreme position, defined by the retracted position of the thrust reverser 15-17, regardless of the technology of the latter.

It is understood, in particular if the nacelle is not equipped with a thrust reverser, that the longitudinal position of the downstream partition wall along the nacelle is not determined and that the downstream edge of the external envelope 3 or fan cowl, can extend up to the mid-section of the nacelle.

In the form of the present disclosure represented in FIG. 2, the substantially cylindrical internal envelope 19, 11 consists of an annular body composed of two parts, respectively an acoustic shroud 19 and a fan casing, combined together by an attachment flange 18. According to the present disclosure, the two upstream 2 and downstream 6 partition walls are secured by their internal edges, directed toward the central axis of the nacelle, to the external surface of the substantially cylindrical internal envelope 19, 11. Thus, in the form of FIG. 2, the two upstream 2 and downstream 6 partition walls are secured, by their internal edges, respectively to the acoustic shroud 19 and to the fan casing 11.

According to a features of the present disclosure, the downstream edge 4 of the front lip 1 is then extended beyond the upstream (front) partition wall 2. However, its longitudinal extension along the nacelle is interrupted above the reserved volume between the two upstream 2 and downstream 6 partition walls so as to maximize the area of laminar flowing on the external envelope, within the limits of the manufacturing constraints of the part and while allowing access to the members of fastening the air inlet to the flange 18 of the fan casing 11.

In the form of FIG. 2, the inlet section of the nacelle also includes a substantially cylindrical internal envelope 19, 11 the front (upstream) end of which is attached, in a known manner, to the internal edge of the front lip 1 as well as to the lower edge of the upstream partition wall 2, and the rear (downstream) end of which is attached, in a dismountable manner, to the flange 18 of the fan casing 11. In order to locate the components of the nacelle, there is also represented the hub 13 of the fan of the turbojet engine mounted inside the nacelle, and a blade 12 of this fan.

Hence, the external envelope 3 of the inlet section of the nacelle presents an upstream longitudinal edge which is secured to the downstream edge 4 of the extended front lip 1 and a downstream longitudinal edge 8 which interfaces, as visible in the section shown in FIG. 2, with the movable external cowl 10 of the thrust reverser 15-17. The rear (downstream) partition wall 6 is secured to the fan casing 11 of the internal envelope 11, 19. The function of the downstream partition wall 6 is to support the internal face of the external envelope 3. In one form, it also carries means 5 of fastening to the external envelope 3.

In the form of FIG. 2, for construction reasons related to the turbojet engine, the acoustic shroud 19 which composes the internal envelope 19, 11 is interrupted at the level of the blades of the fan, and then, the internal envelope 19, 11 continues extending by the sole fan casing 11, which is distinct from the fan cowl constituted with the external envelope 3. In all forms, the fan casing 11 carries the lower edge of the downstream partition wall 6, and therefore extends at least up to the rest area of the thrust reverser 15-17.

The internal envelope 19, 11 includes an acoustic shroud which is essentially constituted by a composite panel which allows reducing the sound emission of the inlet section of the nacelle. This acoustic shroud is here extended up to the mid-section of the nacelle.

Another function of the upstream (front) partition wall 2 is to support the upper lip 1, the circumferential external edge of the upstream partition wall 2 being carried by the internal face of the front lip 1. In one form, according to the present disclosure, the upstream partition wall 2 carries no through fastening means that may disturb the aerodynamic profile of the inlet section of the nacelle.

The remaining of the inlet section of the nacelle which therefore includes the extended lip 1 and the external envelope 3, or fan cowl, continues extending by a downstream section which is represented in FIG. 2 by a movable outer cowl 10 of the thrust reverser 15-17. When the movable outer cowl 10 is in the open or retracted position, the thrust reverser 15-17 is then in the thrust reversal configuration and the air jet is then at least partially reversed outside the inlet section of the nacelle.

As a result, the extension downstream of the external envelope 3 is limited by the design of the downstream section of the nacelle and more particularly by the design of the thrust reverser. Indeed, the downstream longitudinal edge 8 then must be located at the limit of the extension of the reversed air jet produced by the thrust reverser 15-17.

In the form of FIG. 2, the thrust reverser includes mainly an upstream frame 16 and a downstream frame 17 between which a plurality of cascades configured here to be inactive, are mounted. When an appropriate actuator (not represented) is activated to reverse the air jet crossing the inlet section of the nacelle, the movable outer cowl 10 switches in the retracted position, a flap 14 disposed at the downstream edge of the internal envelope 19, 11 tilts in order to intercept at least one portion of the inlet air jet of the nacelle coming from the fan (not represented) and the cascades are then disposed and extended so as to profile the jet forward (upstream) the nacelle, but outside the external envelope or fan cowl 3.

Hence, the nacelle inlet section of the form of FIG. 2 of the present disclosure includes:
the extended front lip 1; and
the external envelope or fan cowl 3;
which are secured to each other by their opposite edges 4 and by the two upstream 2 and downstream 6 partition walls.

Note that the downstream edge 8 of the external envelope 3 is free whereas the internal face of the extended front lip 1 is secured to the internal end of the upstream partition wall 2 and to the upstream edge of the internal envelope 19, 11.

FIG. 3 illustrates the features of FIG. 2 in detail. The downstream edge 4 (FIG. 2) of the extended front lip 1 is flush with the homologous longitudinal edge of the external envelope 3. The fastening is achieved by means of an annular plate 21 which carries fastening means of the rivets and/or bolts kind represented only by centerlines 22 with the front lip 1 and 23 with the external envelope 3.

In one form, at least for one radial sector of the external envelope 3, there is provided a removable-type fastening. This is mainly the case when the external envelope 3 is constructed into several (at least two) panels which cover radial sectors of the external envelope and when at least one of these panels can be dismounted during maintenance operations.

In this arrangement, at least the dismountable panel(s) of the external envelope 3 is/are also fastened, by means of removable fastening elements, on the downstream partition wall 6, so that such a panel can then be dismounted and access to the volume enclosed in this inlet section of the nacelle becomes possible for the maintenance and/or inspection operations.

One advantage of this arrangement of removable panels is to avoid resorting to access hatches which constitute a weakening of the mechanical rigidity and the force pathways of the external envelope 3.

In particular, when at least one panel of the external envelope 3 is removable, the annular plate 21 which allows the relative fastening 4 of the homologous edges of the extended front lip and of the external envelope 3 is permanently fastened to the internal face of the downstream edge of the extended front lip.

In one form of the present disclosure, the annular plate 21 is integral with the downstream edge of the extended front lip 1. To this end, it consists of a portion disposed on the internal face of the upper edge 4 of the front lip 1.

In order that the disclosure may be well understood, there will now be described various forms thereof, given by way of example, reference being made to the accompanying drawings, in which:

In one form of the present disclosure, the extended front lip 1 is made of metal, more particularly of aluminum. In another form, the extended front lip 1 is made of a composite material obtained by molding a resin which impregnates a technical fabric made from technical fibers such as carbon fibers, glass fibers or poly(p-phenyleneterephthalamide) fibers (Kevlar®). FIG. 2 is a perspective view of the area (II) defined in FIG. 1 of the thrust reverser device according to the present disclosure;

In one form of the present disclosure, the external envelope 3 is made of metal, more particularly of aluminum. In another form, the external envelope 3 is made of a composite material obtained by molding a resin which impregnates a technical fabric made from technical fibers such as carbon fibers, glass fibers or poly(p-phenyleneterephthalamide) fibers (Kevlar®).

In one form represented in FIG. 2, the internal face of the external envelope 3 and/or of the extended front lip 1 includes annular reinforcements. On the internal face of the extended front lip 1, there is disposed a first series of reinforcements, or stiffeners, S which affect the shape of annular parts the section of which is <<C>>-shaped in order to enhance the rigidity of the portion of the lip 1 that separates the inlet air flow. The annular reinforcements S consist of revolving parts which cover the internal face of the front lip 1 over its entire periphery. The annular reinforcements S consist of parts that are secured by bonding across the thickness of the front lip or parts that are made in one-piece with the latter, in particular when the front lip is made of a composite material.

The extended front lip 1 of the form of FIG. 2 also includes a second series of reinforcements, or stiffeners, S', disposed beyond the upstream partition wall and which are analog to the reinforcements S.

On the internal face of the external envelope 3, there is also disposed a series of reinforcements, or stiffeners, S", which are analog to the reinforcements S.

In FIGS. 4 and 5, there are represented two exploded views of the mounting of a turbojet engine in a nacelle of the present disclosure. In FIG. 4, the extended front lip 1 has been represented in four assembled sectors, each sector occupying a 90° angular sector whereas the external envelope 3 is composed of three exploded sectors, respectively 3-1 to 3-3. Each sector 3-1 to 3-3 occupies an angular sector ranging from 90 to 180° and is installed on the downstream edge of the front lip 1 and on the external radial edge of the downstream partition wall 6. The downstream partition wall 6 and the cascades 15 of the thrust reverser are carried, and the rear portion of the turbojet engine with the ejection cone and nozzle, are also represented.

In FIG. 5, which is a rear (downstream) view of the nacelle, the same elements as those of the other figures carry the same reference numerals. The front lip 1 is viewed from its downstream edge, with a portion of the upstream partition wall 2 and the downstream partition wall 6 mounted on the fan casing (FIG. 2).

Figure 6:
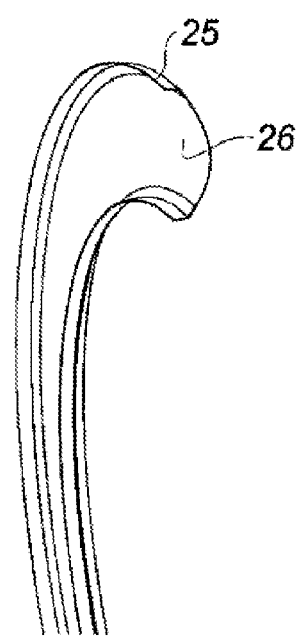

In FIG. 6, there is represented a portion of an upstream (or front) partition wall which includes a «C»-shaped curved bottom 26 and two lateral edges such as the edge 25. The function of the upstream partition wall is to reinforce the mechanical rigidity of the inlet section of the nacelle, but also to serve as a stop to the projectiles that may impact the nacelle, in particular the birds that are hit during flight. Another function of the upstream partition wall 2 is to support the lower face of the extended front lip (see 1, FIG. 2). In one form, it has no through fastening means with the front lip as has been exposed above, in order to avoid any surface imperfection on the external face and thereby preserve a laminar flowing as far as possible downstream.

Figure 7:
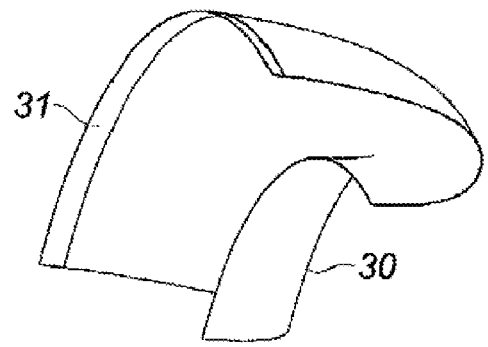

In FIG. 7, there is represented a portion of an extended front lip according to the present disclosure, including a leading edge 30 which will delimit the air flow during flight and terminating by a downstream edge 31 which is intended to be connected with the homologous edge of the external envelope 3. Note the presence of the bearing plate (with no reference numeral, see 21, FIG. 3) on which rests the edge of the envelope.

The extended front lip allows delimiting the inlet air flow in the turbojet engine during flight. But, with the upstream partition wall, it also delimits a <<D>>-shaped internal volume which is used for receiving a heat-transfer fluid for providing de-icing of the inlet section of the nacelle during flights in icing conditions.

Note that the downstream extension of the extended front lip of the present disclosure, in particular thanks to its system of fastening with the external envelope, achieves an aerodynamic skin continuity with low drag.

Figure 8:
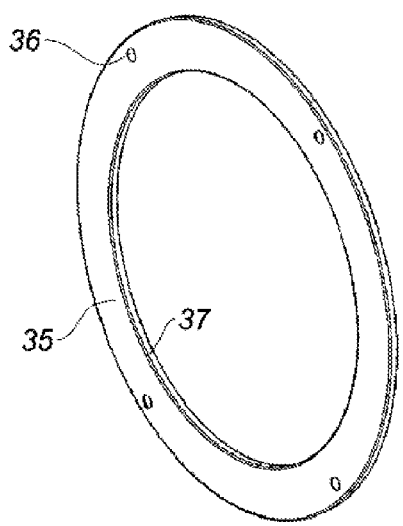

In FIG. 8, there is represented an example of downstream (or rear) partition wall which takes the shape of a flat annular disc 35 the internal edge 37 of which is intended to be secured, by means of non represented flanges, on the external surface of the internal envelope (see 11, FIG. 2) of the inlet section of the nacelle or the fan casing.

The two main functions of the downstream partition wall consist in serving as a support to the external envelope or fan cowl and serving as a second barrier to the projectiles that would have passed through the upstream partition wall. In the present disclosure, in order to allow proper support of the external envelope, the downstream partition wall is moved back along the central axis of the nacelle, as close as possible to the rest position of the thrust reverser, as has been exposed above.

Figure 9:
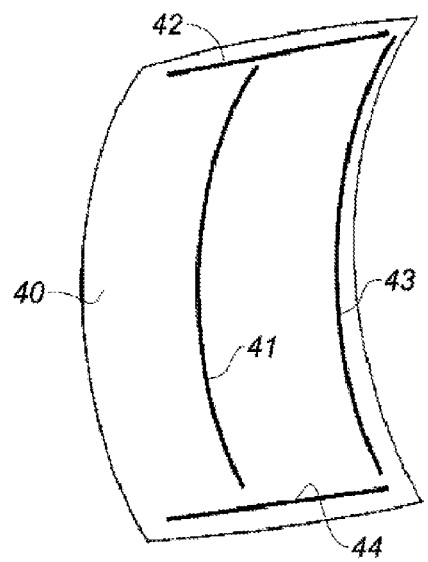
Figure 10:
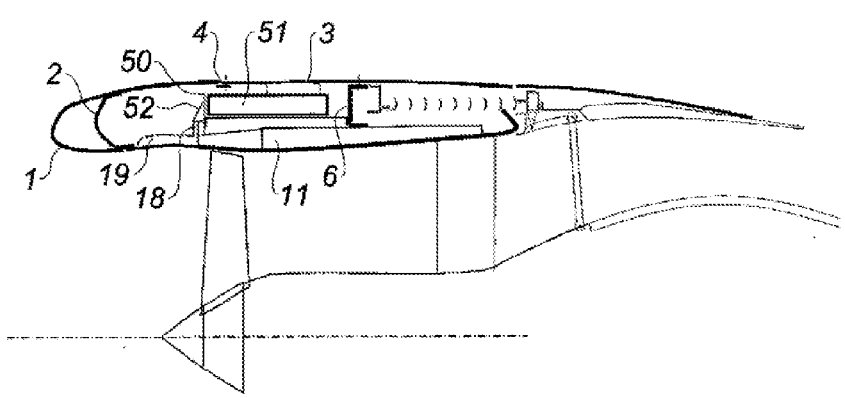

In FIG. 9, there is represented a schematic view of a sector of the external envelope which includes a curved plate 40 viewed from its internal side, and on which are disposed two fastening lines 42 and 44 with the two sectors adjacent to the sector 40 and two fastening lines 41 and 43 respectively to the downstream partition wall (not represented) and to the homologous edge of the extended front lip. Note that the orientation of FIG. 9 is opposite to the orientation of FIG. 2.

In FIG. 10, there is represented another form of a nacelle according to the present disclosure wherein at least one additional partition wall sector 50 has been disposed in order to protect, as second line, an equipment 51 to be protected from an impact which would have passed through the front lip 1 then the upstream partition wall 2. The additional partition wall sector 50 is mounted on an annular support achieved on the external surface of the internal envelope (19, 11) or fan casing. In the form of FIG. 10 which takes up most of the elements of the form of FIG. 2 which carry the same reference numerals and which are not more described, the annular support achieved on the external surface of the internal envelope is constituted by the attachment flange 18 between the acoustic shroud 19 and the fan casing 11.

In order to improve the mechanical strength of the additional partition wall 50, one or several reinforcement(s), such as the reinforcement 52, are added at least at determined angular positions. In particular, the equipment 51 to be protected consists of a calculator for driving services of the nacelle or the engine to control services such as the de-icing and/or the thrust reversal, or the adjustment of the engine thrust. In this case, the implantation of the equipment 51 in the inlet section of the nacelle determines the sector (such as 40, FIG. 9) of the external envelope (3, FIGS. 2, 3-1 to 3-3, FIG. 4) that can be dismountable during maintenance thanks to removable fastening means (41-44). The other adjacent sectors of the external envelope 3 may remain permanently fastened to the front lip 1 and/or to the downstream partition wall 6. Dismounting one single sector 40 of the external envelope 3 allows reducing the mass to be dismounted and handled during a maintenance operation.

Note that the arrangement described in particular through the forms of FIGS. 2 and 10, allows reducing the mass of the nacelle inlet section which comprises here the extended front lip 1 and the external envelope 3, by removing the attachment flanges and the fastening means as well as the heavy access hatches which would be weaken the assembly. Thanks to the present disclosure, it is no longer necessary to use systems for opening the external envelope or fan cowl using a hinge-type mechanism with safety brackets and cylinders. Dismounting the single dismountable sector of the external envelope 3 makes this mechanism useless and reduces both the complexity and the mass of the nacelle, while allowing to preserve a laminar flowing around the nacelle as far as possible downstream.

What is claimed is:

1. A nacelle for an aircraft turbojet engine including a substantially cylindrical internal envelope, a substantially cylindrical external envelope, a downstream partition wall and an upstream partition wall secured to said cylindrical internal envelope and a front lip disposed forward of the upstream partition wall, the cylindrical internal envelope comprising an upstream portion including an acoustic shroud connected, by an attachment flange, to a downstream portion including a fan casing,
    wherein the attachment flange is disposed between the upstream partition wall and the downstream partition wall, and no intermediate wall is disposed between the upstream partition wall and the downstream partition wall, and
    wherein the front lip is extended and disposed over the upstream partition wall includes a downstream edge disposed between the upstream and downstream partition walls and secured to a homologous edge of the cylindrical external envelope so as to arrange a maintenance access to said attachment flange.

2. The nacelle according to claim 1, wherein the downstream partition wall is disposed on the fan casing at a limit of a rest area of a thrust reverser, and the cylindrical external envelope extends beyond the thrust reverser on said downstream partition wall.

3. The nacelle according to claim 1, wherein the cylindrical external envelope is fastened by fastening means also to an edge of the downstream partition wall.

4. The nacelle according to claim 1, wherein the fastening of homologous edges of the extended front lip and the cylindrical external envelope comprises at least one annular plate which carries means of fastening to the downstream edge of the extended front lip and to the homologous edge of the cylindrical external envelope.

5. The nacelle according to claim 4, wherein said at least one annular plate is integral with an internal face of the downstream edge of the extended front lip.

6. The nacelle according to claim 1, wherein the extended front lip and/or the cylindrical external envelope are made of at least two angular sectors.

7. The nacelle according to claim 6, wherein at least one angular sector of the cylindrical external envelope is provided with removable means of fastening to the extended front lip, removable means of fastening to the downstream partition wall and removable means of fastening to an adjacent angular sectors of the cylindrical external envelope.

8. The nacelle according to claim 1, wherein the extended front lip and/or the cylindrical external envelope is made of metal.

9. The nacelle according to claim 8, wherein an internal face of the cylindrical external envelope and/or the extended front lip comprises annular reinforcements.

10. The nacelle according to claim 8, wherein the extended front lip and/or the cylindrical external envelope is made of aluminum.

11. The nacelle according to claim 1, wherein the extended front lip and/or the cylindrical external envelope is made of a composite material.

12. The nacelle according to claim 1, wherein the nacelle comprises at least one additional partition wall angular sector, secured to an internal envelope of an inlet section of the nacelle and disposed between the upstream partition wall and the downstream partition wall.

* * * * *